US009289784B2

(12) United States Patent
Moon et al.

(10) Patent No.: US 9,289,784 B2
(45) Date of Patent: Mar. 22, 2016

(54) SHOWERHEAD FOR GENERATING MICRO AIR BUBBLES

(75) Inventors: Hong Yeon Moon, Gyeonggi-do (KR); Min Chul Kim, Gyeonggi-do (KR); Jung In Koo, Gyeonggi-do (KR)

(73) Assignee: Robotous Co., Ltd., Gyeonggi-do (KR)

( * ) Notice: Subject to any disclaimer, the term of this patent is extended or adjusted under 35 U.S.C. 154(b) by 138 days.

(21) Appl. No.: 13/820,337

(22) PCT Filed: Jul. 6, 2011

(86) PCT No.: PCT/KR2011/004942
§ 371 (c)(1),
(2), (4) Date: Mar. 1, 2013

(87) PCT Pub. No.: WO2012/030062
PCT Pub. Date: Mar. 8, 2012

(65) Prior Publication Data
US 2013/0161418 A1 Jun. 27, 2013

(30) Foreign Application Priority Data

Sep. 1, 2010 (KR) .................. 10-2010-0085615

(51) Int. Cl.
*B05B 1/14* (2006.01)
*B05B 1/16* (2006.01)
*B05B 1/18* (2006.01)
*B05B 7/04* (2006.01)
*G01F 15/00* (2006.01)

(52) U.S. Cl.
CPC ............. *B05B 1/1609* (2013.01); *B05B 1/1627* (2013.01); *B05B 1/1636* (2013.01); *B05B 1/18* (2013.01); *B05B 7/0425* (2013.01); *G01F 15/001* (2013.01)

(58) Field of Classification Search
USPC ........................................................ 239/553
See application file for complete search history.

(56) References Cited

U.S. PATENT DOCUMENTS

| 5,433,384 | A  | * | 7/1995  | Chan et al.   | 239/449 |
|-----------|----|---|---------|---------------|---------|
| 6,412,711 | B1 | * | 7/2002  | Fan           | 239/446 |
| 6,607,148 | B1 | * | 8/2003  | Marsh et al.  | 239/447 |
| 7,380,731 | B1 | * | 6/2008  | Hsu           | 239/447 |
| 7,818,828 | B2 | * | 10/2010 | Zhou          | 4/615   |
| 8,066,203 | B2 | * | 11/2011 | Zhou          | 239/443 |

(Continued)

FOREIGN PATENT DOCUMENTS

| CN | 101795757   | 8/2010 |
|----|-------------|--------|
| JP | 2007 209509 A | 8/1923 |

(Continued)

*Primary Examiner* — Len Tran
*Assistant Examiner* — Adam J Rogers
(74) *Attorney, Agent, or Firm* — Occhiuti & Rohlicek LLP

(57) ABSTRACT

A showerhead for generating micro air bubbles includes: a body including an inflow part disposed at one end thereof for supplying shower water, and a discharge part disposed at the other end thereof for discharging the shower water supplied through the inflow part; a bubble-generating part coupled to the discharge part, and including bubble-generating tubes which expand in the discharge direction of the shower water; a fluid regulator part for opening/closing a portion of the bubble-generating tubes; and a shower part disposed in front of the bubble-generating part, and including shower holes for discharging shower water. Since the bubble-generating part for generating micro air bubbles is disposed within the showerhead, shower water including micro air bubbles can be used by simply replacing a typical showerhead with the above-described showerhead.

13 Claims, 11 Drawing Sheets

(56) References Cited

U.S. PATENT DOCUMENTS

| | | | |
|---|---|---|---|
| 2003/0029935 A1* | 2/2003 | Takeshi et al. | 239/428.5 |
| 2009/0321538 A1* | 12/2009 | Lo | 239/443 |
| 2010/0127096 A1* | 5/2010 | Leber | 239/101 |
| 2011/0240767 A1* | 10/2011 | Kitaura et al. | 239/428.5 |
| 2012/0067979 A1* | 3/2012 | Kim | 239/427 |

FOREIGN PATENT DOCUMENTS

| | | |
|---|---|---|
| JP | 2004 136085 | 5/2004 |
| JP | 2007 089710 | 4/2007 |
| JP | 2008-237601 A | 10/2008 |
| KR | 10 0902136 B1 | 6/2009 |

\* cited by examiner

SHOWERHEAD FOR GENERATING MICRO AIR BUBBLES

CROSS REFERENCE TO RELATED APPLICATIONS

This application is a National Stage of International Application No. PCT/KR2011/004942 filed on Jul. 6, 2011, which claims priority to Korean Application No. 10-2010-0085615 filed Sep. 1, 2010, the contents of which are hereby incorporated by reference in their entirety.

TECHNICAL FIELD

The present invention relates to a showerhead of a shower, and more particularly, to a showerhead for generating micro air bubbles in shower water to supply the shower water containing the micro air bubbles.

BACKGROUND ART

Due to water pollution, a recent general trend is to obtain drinking water through installing a water purifier or buying mineral water.

Moreover, the trend for cleaning water is to also obtain it through purification in a water purifier or a water softener or use functional cleaning water, instead of using tap water or ground water.

Also, because chemicals (soaps, cleaners, detergents, cosmetics, and the like) and contaminants have been found to cause contact dermatitis or atopy, an important issue that has recently emerged is to obtain safe cleaning water that improves the cleaning effects of the above materials and also minimizes skin irritation.

Thus, a method for using cleaning water by generating a large quantity of small micro bubbles of one to several tens of μm in size is receiving attention. Micro bubbles that are smaller than the pores of skin may enter the pores and remove foreign substances and germs. Also, because micro bubbles generate various forms of energy such as ultrasonic waves, sudden high heat and the like when they burst in water, the use of these properties related to bursting is being expanded even to water purifiers, medical apparatuses, and the like.

However, in an apparatus for generating micro air bubbles according to a related art, micro air bubbles should be previously generated and secured in an apparatus for supplying micro air bubbles before washing water is used. For this, a predetermined time may be required, and also, a separate space for installing the apparatus for supplying micro air bubbles may be needed. In addition, since the corresponding apparatus is generally installed on a wall, its installation may be cumbersome.

DISCLOSURE OF THE INVENTION

Technical Problem

The present invention provides a showerhead for generating micro air bubbles.

Technical Solution

According to an aspect of the present invention, a showerhead includes: a body having an end in which an inflow part for introducing shower water is disposed and the other end in which a discharge part for discharging the shower water introduced through the inflow part is disposed; a bubble-generating part coupled to the discharge part, the bubble-generating part including a plurality of bubble-generating tubes which are expanded in a discharge direction of the shower water; a fluid regulator part for opening or closing a portion of the whole of the bubble-generating tubes; and a shower part disposed in a front side of the bubble-generating part, the shower part having a plurality of shower holes through which the shower water is discharged to the outside.

The fluid regulator part may include: a shield part for opening or closing a portion or the whole of the plurality of bubble-generating tubes and a manipulation part interlocked and coupled to the shield part to manipulate the shield part at the outside of the body.

The shield part may be rotatably coupled to the manipulation part.

The shield part may include at least one shield plate extending in an outer direction of a rotation shaft.

Portions of the plurality of bubble-generating tubes may be disposed between a radius of rotation of a frame and a radius of rotation of the shield plate so that the portions of the bubble-generating tubes are selectively opened or closed according to a position of the shield plate.

The shield plate may have a plurality of openings that are defined in positions corresponding to portions of the plurality of bubble-generating tubes.

The shield part may include a sliding plate having one surface that is closely attached to a back surface of the bubble-generating part to open or close inlets of the bubble-generating tubes in a slide manner.

The showerhead may further include an interlocking part disposed between the shield part and the manipulation part to convert rotation movement of the manipulation part into sliding movement of the sliding plate.

A first tooth may be disposed on a back surface of the sliding plate, a cylindrical screw part on which a first male thread is disposed on a side surface thereof may be disposed on an end of the manipulation part, the interlocking part may include a fan-shaped plate, wherein a second tooth corresponding to the first tooth may be disposed on one portion of a curved surface of the interlocking part, and a third tooth corresponding to the first male thread may be disposed on the other portion of the curved surface of the interlocking part, and the interlocking part may be coupled so that the second tooth is engaged with the first tooth, and the third tooth is engaged with the first male thread.

The shield part may be spaced apart from a side of an inlet of each of the bubble-generating tubes, and a distance between the shield and the inlet of each of the bubble-generating tubes may be adjusted by the rotation of the manipulation part.

The shield part may include a fluid regulator pin, which is insertable into each of the bubble-generating tubes, on one surface thereof.

A cylindrical bolt part on which a male thread is disposed on a side surface thereof may be disposed on a back surface of the shield part, and a nut part having a cylindrical groove so that the bolt part is inserted therein and a female thread corresponding to the male thread along the inside of the groove may be disposed on an end of the manipulation part.

A cylindrical bolt part on which a male thread is disposed on a side surface thereof may be disposed on an end of the manipulation part, and a nut part having a cylindrical groove so that the bolt part is inserted therein and a female thread corresponding to the male thread along the inside of the groove may be disposed on a back surface of the shield part.

The showerhead may further include an acceleration part disposed between the discharge part and the bubble-generating part, the acceleration part having an ejecting hole with a diameter less than an inner diameter of the discharge part.

The showerhead may further include a collision wall disposed between the bubble-generating part and the shower part to collide with the shower water discharged through the bubble-generating tubes and a bypass part having a passage to bypass the shower water colliding with the collision wall toward the shower holes.

The body may further include an auxiliary passage that is branched from a passage connecting the inflow part to the discharge part so that an outlet thereof is disposed at a side of the discharge part.

The auxiliary part may have an outlet between the bubble-generating part and the shower part.

The showerhead may further include a fluid regulator, which passes through the auxiliary passage to open or close the auxiliary passage at the outside of the body, on a side of the body.

An outlet of a passage through which the inflow part and the discharge part communicate with each other may be disposed on a position at which the shower water discharged into the discharge part through the inflow part rotates along an inner surface of the discharge part.

Advantageous Effects

The showerhead according to the present invention may generate micro air bubbles therein. Thus, only the showerhead may be replaced to provide shower water containing the micro air bubbles.

Also, when the user is washed by using the shower water containing the micro air bubbles which discharged from the showerhead, skin refreshing effects and skin anti-oxidation effects may be obtained by anions due to the micro air bubbles. Also, the micro air bubbles may be permeated into skin's pores to remove germs and sediments within the pores, thereby improving cleaning performance and providing oxygen into the pores.

Thus, the cleaning effects may be realized without using cleaning agents such as soaps. Thus, wastes or impurities within the skin may be effectively removed through the washing effect. In addition, since the chemical cleaning agents are not used, atopy may be prevented. Also, since the showerhead of the prevent invention provides cleaning performance superior to that of a general showerhead, sufficient cleaning effects may be realized by using a relatively small amount of shower water, and thus, water saving effects may be improved.

The feature of the present invention is not limited to the aforesaid, but other features not described herein will be clearly understood by those skilled in the art from descriptions below.

MODE FOR CARRYING OUT THE INVENTION

Figure 1:
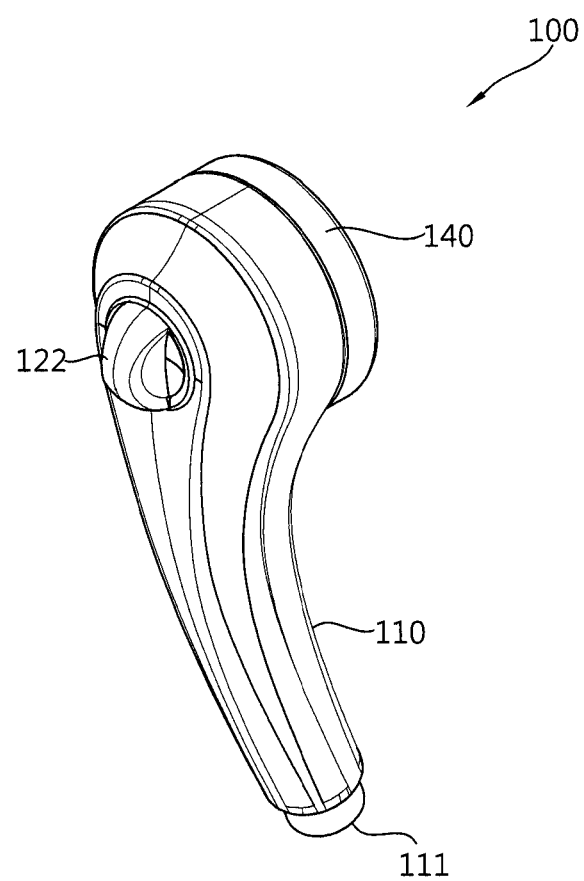
FIG. 1 is a perspective view of a showerhead according to a first embodiment of the present invention.

Reference will now be made in detail to embodiments, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the drawings, the thicknesses of layers and regions are exaggerated for clarity. Like reference numerals in the drawings denote like elements, and thus their description will be omitted.

Figure 2:
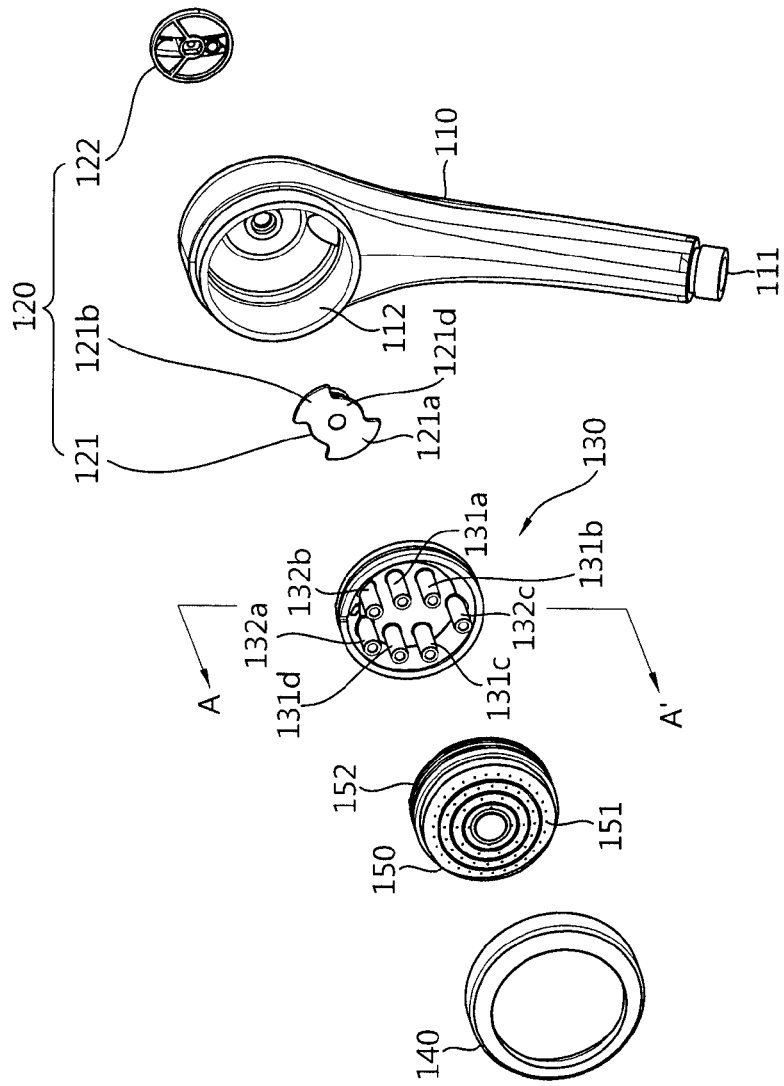
FIG. 2 is an exploded view of the showerhead according to the first embodiment of the present invention.

FIG. 1 is a perspective view of a showerhead 100 according to a first embodiment of the present invention, and FIG. 2 is an exploded view of the showerhead 100 according to the first embodiment of the present invention.

Referring to FIGS. 1 and 2, the showerhead 100 according to the first embodiment of the present invention may include a body 110, a bubble-generating part 130 generating micro air bubbles, a fluid regulator part 120 adjusting a flow rate of shower water introduced into the bubble-generating part 130, and shower part 150 discharging shower water.

Hereinafter, the above-described components will be described with reference to the accompanying drawings.

As shown in FIGS. 1 and 2, the body 110 has one end to which a water supply hose (not shown) for supplying shower water is coupled to define an inflow part 111 through which shower water is introduced and the other end communicating with the inflow part 111 to define a discharge part 112 through which the shower water is discharged. The inflow part 111 may be screw-coupled to the water supply hose. Also, a rubber packing for preventing water from leaking may be disposed on the coupled portion between the inflow part 111 and the water supply hose.

Also, the body 117 surrounding a passage between the inflow part 111 and the discharge part 112 may serve as a handle to be grasped by a user when the showerhead 100 is used.

The shower water passing through the discharge part 112 is introduced into the bubble-generating part 130. The bubble-generating part 130 includes a plurality of bubble-generating tubes 131a, 131b, 131c, 131d, 132a, 132b, and 132c. The washer water may contain micro air bubbles while passing through the bubble-generating tubes 131a, 131b, 131c, 131d, 132a, 132b, and 132c.

The fluid regulator part 120 is disposed on a back surface of the bubble-generating part 130. The fluid regulator part 120 is rotatably disposed. Also, the fluid regulator part 120 includes a shield part 121 for opening or closing inlets of the bubble-generating tubes 131 and a manipulation part 122 for manipulating the shield part 121 at the outside of the body 110. The manipulation part 122 is coupled to the shield part 121 through the other side of the body 110 so that the shield part 121 is manipulated at the outside of the body 110.

The bubble-generating part 120 and the fluid regulator part 120 will be described later in more detail.

The shower water containing the micro air bubbles while passing through the bubble-generating part 130 is introduced into the shower part 150. The shower part 150 may have a dome shape. Also, a plurality of shower holes 151 passing through a front surface of the shower part 150 so that the shower water introduced into the shower part 150 is uniformly discharged are uniformly defined in the front surface of the shower part 150.

The shower part 150 may be coupled to the inside of the discharge part 112 defined in the body 110. Thus, the shower part 150 may have an outer diameter slightly less than an inner diameter of the discharge part 112 so that the shower part 150 is fitted into the discharge part 112. Also, a groove 152 in which a sealing member (not shown) is disposed along an outer circumference of the shower part 150 may be defined in an outer circumference of the shower part 150. A rubber ring may be used as the sealing member. The sealing member may be disposed on the groove 152 to black leakage of water and also firmly couple the shower part 150 to the body 110.

Also, a banding part 140 may be disposed along an outer circumference of the shower part 150. The banding part 140 has a band shape to expose the shower holes 151 defined in the shower part 150. Also, a front surface of the banding part 140 may be flush with that of the shower part 150. Also, the banding part 140 may have an inner diameter slightly greater than an outer diameter of the discharge part 112 so that an inner surface of the banding part 140 is fitted into an outer surface of the discharge part 112. Alternatively, the banding part 140 may be screw-coupled to the outer surface of the discharge part 112.

The banding part 140 may cover the coupled portion between the shower part 150 and the discharge part 112 to define an outer appearance of the shower head 100 and also prevent the shower part 150 from being separated from the discharge part 112 by a water pressure.

Hereinafter, the bubble-generating part 130 will be described in detail.

Figure 3:
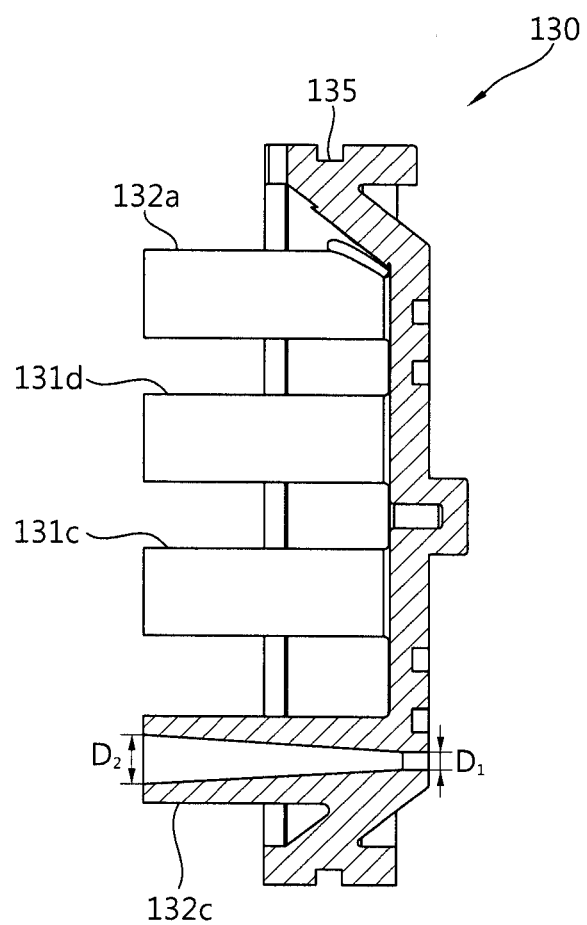
FIG. 3 is an exploded cross-sectional view taken along line A-A' of FIG. 1.

FIG. 3 is a cross-sectional view of the bubble-generating part. Referring to FIG. 3, each of the plurality of bubble-generating tubes 131a, 131b, 131c, 131d, 132a, 132b, and 132c has an inlet diameter D1, through which shower water is introduced, less than an outlet diameter D2 through which the shower water is discharged. Also, each of the plurality of bubble-generating tubes 131a, 131b, 131c, 131d, 132a, 132b, and 132c may be inclinedly expanded in a traveling direction of the shower water (D<D2). The inlet diameter may range of about 1 mm to about 2 mm.

Since each of the bubble-generating tubes 131a, 131b, 131c, 131d, 132a, 132b, and 132c has the outlet diameter D2 greater than the inlet diameter D1, a flow rate may vary within each of the bubble-generating tubes 131a, 131b, 131c, 131d, 132a, 132b, and 132c to generate water-flowing layers. Thus, a shear force may be applied to the shower water and gases contained in the shower water between the water-flowing layers having the different flow rates and an inner surface of each of the bubble-generating tubes 131a, 131b, 131c, 131d, 132a, 132b, and 132c. As a result, the gases to which the shear force is applied may be divided into micro air bubbles. Thus, the shower water may be changed into shower water containing the micro air bubbles while passing through the bubble-generating tubes 131a, 131b, 131c, 131d, 132a, 132b, and 132c.

The bubble-generating part 130 according to the first embodiment of the present invention may include the bubble-generating tubes 131a, 131b, 131c, and 131d which are openable by the shield 121 (that will be described in detail) and the bubble-generating tubes 132a, 132b, and 132c which are always opened. For this, the bubble-generating tubes 131a, 131b, 131c, and 131d which are openable by the shield part 121 may be disposed within a radius of rotation of the shield part 121. Also, the bubble-generating tubes 132a, 132b, and 132c which are always opened may be disposed out of the radius of rotation of the shield part 121.

The bubble-generating part 130 may be fitted into an inner surface of the discharge part 112. A sealing member such as a rubber ring may be disposed on an outer circumference of the bubble-generating part 130 to enhance the coupling force between the bubble-generating part 130 and the discharge part 112 and prevent washing water from leaking. For this, a groove 135 in which the sealing member is disposed may be defined in an outer surface of the bubble-generating part 130.

Hereinafter, the fluid regulator part 120 will be described in detail.

An amount of micro air bubbles generated in the bubble-generating part 130 may gradually increase as a flow rate of shower water passing through each of the bubble-generating tubes 131a, 131b, 131c, 131d, 132a, 132b, and 132c. When considering that a sectional area of fluid is in inverse proportion to a flow rate of fluid, each of the bubble-generating tubes 131a, 131b, 131c, 131d, 132a, 132b, and 132c should have a small diameter to increase the flow rate of fluid passing through the bubble-generating tubes 131a, 131b, 131c, 131d, 132a, 132b, and 132c. However, when each of the bubble-generating tubes 131a, 131b, 131c, 131d, 132a, 132b, and 132c has the small diameter, an amount of shower water discharged from the showerhead 100 may decrease.

Thus, the fluid regulator part 120 in which portions of the total bubble-generating tubes 131a, 131b, 131c, 131d, 132a, 132b, and 132c, i.e., the bubble-generating tubes 131a, 131b, 131c, and 131d are openable may be provided so that the sum of sectional areas of the whole passages decreases to increase a generation amount of micro air bubbles, and the sum of the sectional areas of the whole passages increases to further secure the flow rate of shower water.

Figure 4:
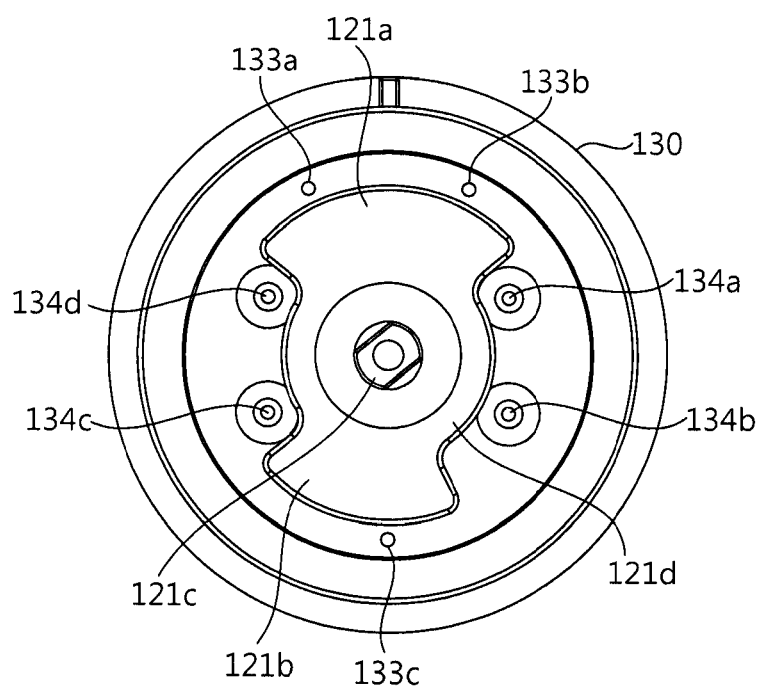
FIG. 4 is a view illustrating a position of a shield part when a discharge flow rate is maximized.
Figure 5:
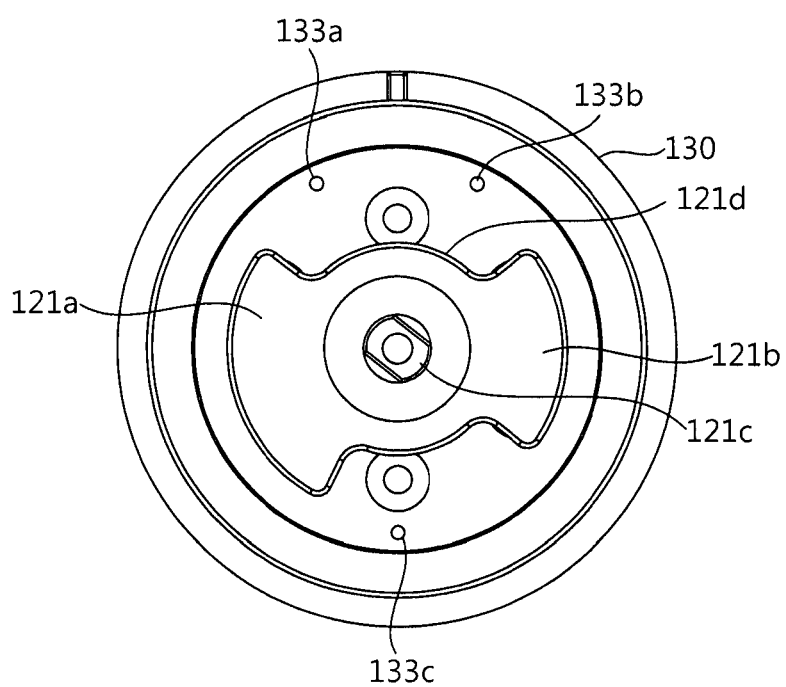
FIG. 5 is a view illustrating a position of the shield part when a discharge flow rate is minimized.

FIG. 4 is a view illustrating a position of the shield part when a discharge flow rate is maximized, and FIG. 5 is a view illustrating a position of the shield part when a discharge flow rate is minimized.

As shown in FIG. 4, the shield part 121 is disposed on a back surface of the bubble-generating part 130. The shield part 121 may include a frame 121d connected to a rotation shaft and shield plates 121a and 121b extending outward from the frame 121d. Also, a support 122c coupled to the manipulation part 122 may be disposed on a central portion of the frame 121d. An end of the support 122c coupled to the manipulation part 122 may pass through the body 110. Also, the manipulation part 122 may be coupled to the end of the support 122c passing through the body 110.

Thus, a user may rotate the manipulation part 122 disposed outside the body 110 to rotate the shield part 121. Also, the shield plates 121a and 121b may rotate to shield inlets 134a, 134b, 134c, 134d of the bubble-generating tube 132.

FIG. 4 illustrates a state in which the inlets 134a, 134b, 134c, 134d of the bubble-generating tube 132 are not blocked by the shield plates 121a and 121b. The bubble-generating tubes 133a, 133b, 133c which are always opened as shown in FIG. 4 may be disposed out of the radius of rotation of the shield plates 121a and 121b. Thus, the bubble-generating tubes 133a, 133b, 133c may not be blocked by the shield plates 121a and 121b.

When the user further rotate the shield plates 121a and 121b, the inlets 134a, 134b, 134c, 134d of the openable bubble-generating tubes 131a, 131b, 131c, and 131d are closed one by one. Thus, in a state of FIG. 5, all of the inlets 134a, 134b, 134c, and 134d of the openable bubble-generating tubes 131a, 131b, 131c, and 131d may be closed.

In this state, as shown in FIG. 5, the only the inlets 133a, 133b, and 133c of the always opened bubble-generating tubes 132a, 132b, and 132c may be opened. Thus, since shower water introduced through the body 110 passes through only the always opened bubble-generating tubes 132a, 132b, and 132c, a flow rate may relatively increase. Thus, micro air bubbles may be more effectively generated.

According to another embodiment, the shield plates 121a and 121b may have a plurality of openings corresponding to the inlets 134a, 134b, 134c, and 134d of the openable bubble-generating tubes 131a, 131b, 131c, and 131d. Thus, when the openings correspond to the inlets 134a, 134b, 134c, and 134d of the openable bubble-generating tubes 131a, 131b, 131c, and 131d, all of the bubble-generating tubes 131a, 131b, 131c, 131d, 132a, 132b, and 132c may be opened. When the shield part rotates so that the openings are dislocated with the inlets 134a, 134b, 134c, and 134d of the openable bubble-generating tubes 131a, 131b, 131c, and 131d, the inlets 134a, 134b, 134c, and 134d of the openable bubble-generating tubes 131a, 131b, 131c, and 131d may be closed, and only the inlets 133a, 133b, 133c of the always opened bubble-generating tubes 132a, 132b, and 132c may be opened.

Protrusions (not shown) disposed at a predetermined distance in a ring shape with respect to the rotation shaft may be disposed between the manipulation part 122 and the body 110 or between the bubble-generating part 130 and the shield plates 121a and 121b. This is done for a reason in which, when the manipulation part 122 rotates, the user recognizes click feeling due to the rotation of the manipulation part 122 through a sense of touch to estimate a rotation amount of the shield plates 121a and 121b, and also, the shield plates 121a and 121b induce the bubble-generating tubes 131a, 131b, 131c, and 131d so that the openable bubble-generating tubes 131a, 131b, 131c, and 131d are precisely disposed at openable positions thereof.

Due to the above-described structure, the showerhead 100 according to the first embodiment of the present invention may discharge shower water that contains micro air bubbles by passing through the bubble-generating part 130. Also, the showerhead 100 may include the fluid regulator part 120 to regulate an amount of the micro air bubble contained in the shower water and a discharge flow rate of the shower water.

Hereinafter, a showerhead 200 according to a second embodiment will be described.

For convenience of description, parts similar to those of the first embodiment will be denoted by the same reference numerals, and duplicated description with respect to the first embodiment will be omitted.

Figure 6:
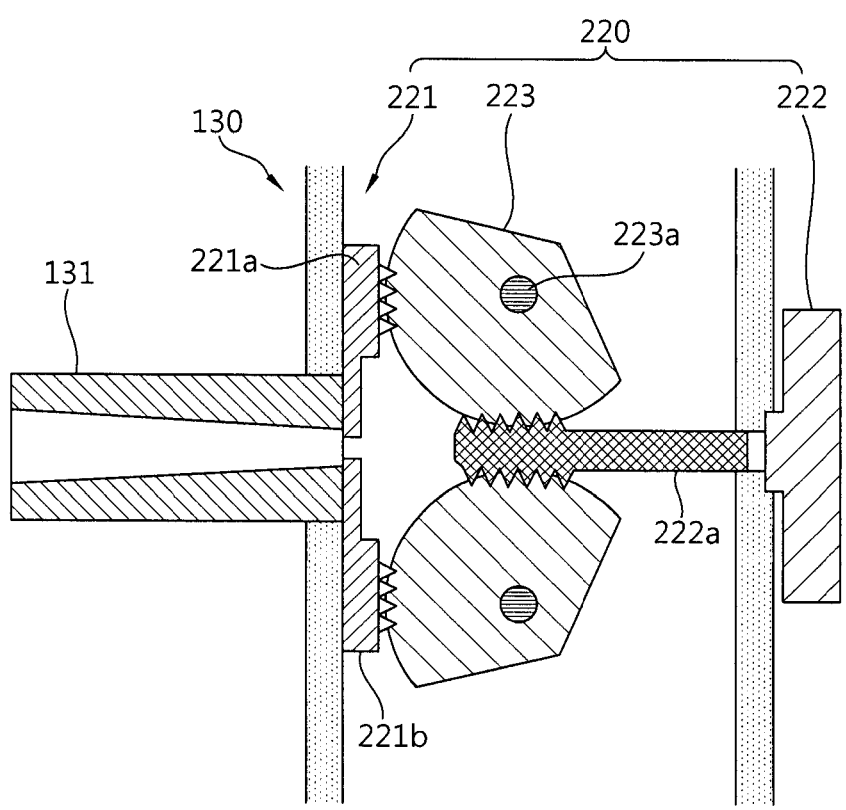
FIG. 6 is a cross-sectional view of a fluid regulator part according to a second embodiment of the present invention.

FIG. 6 is a cross-sectional view of a fluid regulator part according to the second embodiment of the present invention.

Referring to FIG. 6, a fluid regulator part 220 according to the second embodiment is disposed on a back surface of a bubble-generating part 130. Also, the fluid regulator part 220 includes a shield part for opening or closing an inlet of a bubble-generating tube 131, a manipulation part 222 for manipulating the shield part 221 at the outside of a body 110, and an interlocking part disposed between the shield part 221 and the manipulation part 222.

The shield part 221 may include a pair of sliding plates 221a and 221b to open or close the inlet of the bubble-generating tube 131 in a slide manner. One surface of each of the sliding plates 221a and 221b may be closely attached to the back surface of the bubble-generating part 130. Also, a first tooth may be disposed on a back surface of each of the sliding plates 221a and 221b.

The interlocking part 223 between the shield part 221 and the manipulation part 222 may convert a rotation movement of the manipulation part 222 disposed outside the body 110 into a vertical movement of each of the sliding plates 221a and 221b. Although the rotation movement of the manipulation part 222 is converted into the vertical movement of each of the sliding plates 221a and 221b through various methods, the current embodiment utilizes a rack and pinion as an example.

A cylindrical screw part 222a on which a first male thread is disposed on a side surface thereof may be disposed on an end of the manipulation part 222.

The interlocking part 223 may include a fan-shaped plate. A second tooth corresponding to the first tooth disposed on any one of the sliding plates 221a and 221b is disposed on one portion of a curved surface of the interlocking part 223. Also, a third tooth corresponding to the first male thread disposed on the screw part 222a is disposed on the other portion of the curved surface of the interlocking part 223.

In a state where the interlocking part 223 is fixed to a fixing shaft 223a, the third tooth is engaged with the first male thread disposed on the screw part 222a, and the second tooth is engaged with the first tooth disposed on any one of the sliding plates 221a and 221b. The fixing shaft 223a supports the interlocking part 223 so that the interlocking part 223 rotates just.

As shown in FIG. 6, the interlocking part 223 may be disposed on each of both sides of the screw part 222a to vertically move each of the sliding plates 221a and 221b.

Due the above-described structure, when the manipulation part 222 disposed outside the body 110 rotates in one direction by a user, the screw part 222a disposed on the one end of the manipulation part 222 rotates to rotate the interlocking part 223. In this case, when the interlocking part 223 is disposed on each of both sides of the screw part 222a, the interlocking parts 223 may rotate in directions opposite to each other.

As the interlocking part 223 rotates, the shield plates 221a and 221b may approach each other, and the inlet of the bubble-generating tube 131 may be narrowed to reduce a sectional area of a passage thereof. Thus, occurrence of micro air bubbles may be activated.

On the other hand, when the manipulation part 222 disposed outside the body 110 rotates in the other direction, the interlocking part 223 may rotate in an opposite direction so that the sliding plates 221a and 221b are away from each other. Thus, the passage may be widened in sectional area to secure a more amount of shower water.

Thus, the user may control the manipulation part 222 to regulate a flow rate of shower water and a generation amount of micro air bubbles according to user's tastes.

A plurality of interlocking parts 223 may be parallelly disposed on the fixing shaft 223a to regulate flow rates of a plurality of bubble-generating tubes 131 at the same time. Also, although not shown, the plurality of interlocking parts 223 may be linked with the screw part 222a to operate so that the flow rates of the plurality of bubble-generating tubes 131 at the same time.

Hereinafter, a showerhead 300 according to a third embodiment will be described.

For convenience of description, parts similar to those of the first embodiment will be denoted by the same reference numerals, and duplicated description with respect to the first embodiment will be omitted.

Figure 7:
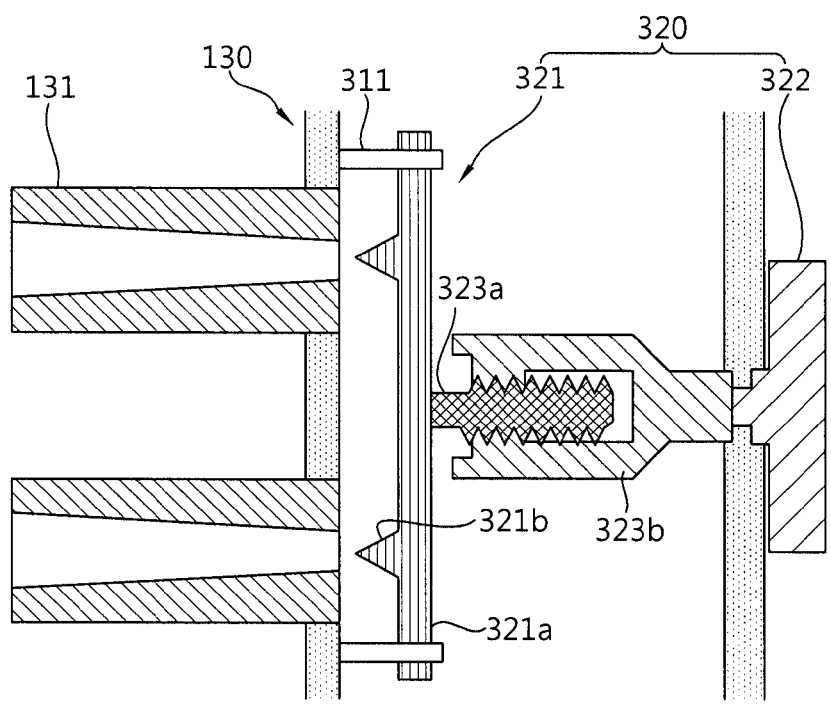
FIG. 7 is a cross-sectional view of a fluid regulator part according to a third embodiment of the present invention.

FIG. 7 is a cross-sectional view of a fluid regulator part according to the third embodiment of the present invention.

Referring to FIG. 7, a fluid regulator part 320 according to the third embodiment includes a shield part 321 disposed on a side of an inlet of a bubble-generating tube 131 to move in a length direction of the bubble-generating tube 131, thereby opening or closing the inlet of the bubble-generating tube 131 and a manipulation part 322 for adjusting a distance between the shield part 321 and the inlet of the bubble-generating tube 131 at the outside of a body 110.

The shield part 321 may include a shield plate 321a and a fluid regulator pin 321b disposed on one surface of the shield plate 321a. A guide bar 311 may be disposed on a back surface of the bubble-generating part 130 to guide the shield part 321 in the length direction of the bubble-generating tube 131 so that the fluid regulator pin 321b is inserted into the bubble-generating tube 131. For this, a hole passing through the shield plate 321a may be defined in an edge of the shield plate 321 to correspond to the installed position of the guide bar 311.

The fluid regulator pin 321b may have a cone shape that has a diameter gradually decreasing toward the bubble-generating tube 131 at a position corresponding to the inlet of the bubble-generating tube 131. In this case, the cone shape may have a bottom diameter equal to or greater than an inlet diameter of the bubble-generating tube 131.

Although the distance between the shield part 321 and the inlet of the bubble-generating tube 131 is variously adjusted by the rotation of the manipulation part 322, the current embodiment adjusts the distance between the shield part 321 and the inlet of the bubble-generating tube 131 by using a bolt part 323a and a nut part 323b as an example.

The bolt part 323a includes a cylindrical body. A second male thread may be disposed on a portion or the while of a side surface of the cylindrical body. The nut part 323b has a cylindrical groove to insert the bolt part 323a therein. Also, a second female thread corresponding to the second male thread disposed on the bolt part 323a is disposed along the groove.

As shown in FIG. 7, the bolt part 323a may be disposed on a back surface of the shield plate 321a, and the nut part 323b may be coupled to the bolt part 323a in a state where the nut part 323b is disposed on an end of the manipulation part 323. Alternatively, the nut part 323 b may be disposed on the back surface of the shield plate 321a, and the bolt part 323a may be disposed on the end of the manipulation part 322.

Due the above-described structure, when the manipulation part 322 disposed outside the body 110 rotates in one direction by the user, the nut part 323b disposed on the end of the manipulation part 322 rotates together with the manipulation part 322. Thus, the nut part 323b may rotate to push the bolt part 323a. The shield plate 321a coupled to an end of the bolt part 323a may be pushed together with the bolt part 323a along the guide bar 311. Thus, the fluid regulator pin 321b may be inserted into the bubble-generating tube 131 through the inlet of the bubble-generating tube 131 to reduce a sectional area of the passage, thereby activating the occurrence of the micro air bubbles.

On the other hand, when the manipulation part 322 disposed outside the body 110 rotates in the other direction, the bolt part 323a may be inserted into the nut part 323b. As a result, the fluid regulator pin 321b may be separated from the bubble-generating tube 131 to the outside through the inlet of the bubble-generating tube 131 to widen the sectional area of the passage, thereby securing a more amount of shower water.

Thus, the user may control the manipulation part 322 to control a flow rate of shower water and a generation amount of micro air bubbles according to user's tastes.

The fluid regulator pin 321b may be provided in plurality to regulate flow rates of the whole or portions of the plurality of bubble-generating tube 131.

Hereinafter, a showerhead 400 according to a fourth embodiment will be described.

For convenience of description, parts similar to those of the first embodiment will be denoted by the same reference numerals, and duplicated description with respect to the first embodiment will be omitted.

Figure 8:
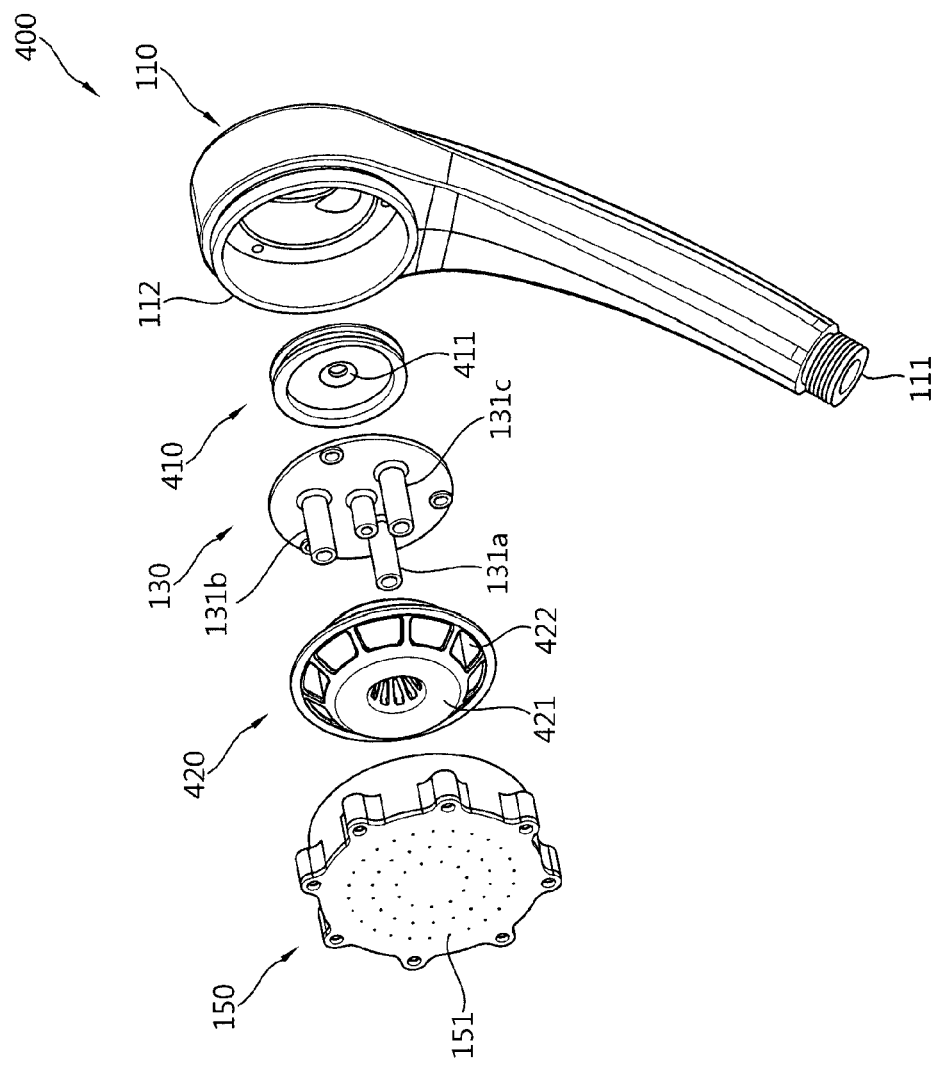
FIG. 8 is an exploded view of a showerhead according to a fourth embodiment of the present invention.

FIG. 8 is an exploded view of a showerhead according to a fourth embodiment of the present invention.

Referring to FIG. 8, the showerhead 400 according to the fourth embodiment may include a body 110, an acceleration part 410 for increasing a flow rate of shower water, a bubble-generating part 130 for generating micro air bubbles, a bypass part 420 for bypassing the shower water containing the micro air bubbles, and a shower part 150 for discharging the washer water containing the micro air bubbles.

When compared to the showerhead 100 according to the first embodiment, the showerhead 400 according to the fourth embodiment further includes the acceleration part 410 for increasing the flow rate of the shower water and the bypass part 420 for bypassing the shower water containing the micro air bubbles.

The acceleration part 410 may have a plate shape in which an ejecting hole 411 is defined. The acceleration part 410 may be disposed inside a discharge part 112. The ejecting hole 411 may increase a flow rate of shower water introduced into the bubble-generating part 130. The reason in which the flow rate of the shower water increases by the acceleration part 410 is because micro air bubbles are well generated in the bubble-generating part 130 as the flow rate of the shower water increased. The ejecting hole 411 may have a diameter of about 3 mm to about 7 mm.

As shown in FIG. 8, the ejecting hole 411 may have a tapered shape of which a diameter increases in an ejection direction of the shower water. When the ejecting hole 411 has the tapered shape, if a plurality of bubble-generating tubes 131a, 131b, and 131c are radially disposed in the bubble-generating part 130, the shower water passing through the ejecting hole 411 may be more uniformly introduced into the bubble-generating tubes 131a, 131b, and 131c.

When the shower water is initially introduced into the bubble-generating tubes 131a, 131b, and 131c in a state where the insides of the bubble-generating tubes 131a, 131b, and 131c are in dry condition, the shower water may have a particular resistance. Thus, a share force may not largely act to discharge the shower water in which the micro air bubbles are not generated. Thus, to prevent the above-described phenomenon from occurring, the bypass part 420 may be provided so that the shower water passing through the bubble generating part 130 is directly introduced into the shower hole 151, but is bypassed by the bypass part 420 to allow a portion of the shower water to be re-introduced into the bubble-generating tubes 131a, 131b, and 131c.

As shown in FIG. 8, the bypass part 420 may include a collision wall 421 that is spaced apart from front ends of the bubble-generating tubes 131a, 131b, and 131c to surround the bubble-generating tubes 131a, 131b, and 131c and through holes 422 radially defined in inner and outer circumferences of the collision wall 421.

Thus, even though the shower water is discharged in a state where the micro air bubbles are not generated in the bubble-generating tubes 131a, 131b, and 131c, portions of the bubble-generating tubes 131a, 131b, and 131c may be closed while the shower water collides with the collision wall 421 disposed on the front surfaces of the bubble-generating tubes 131a, 131b, and 131c and thus is bypassed toward the through holes 422. Thus, the following shower water may be affected by a share force to generate the micro air bubbles.

In the current embodiment, the fluid regulator part 120 may be disposed on a front surface of the bubble-generating part 130 or between the bubble-generating part 130 and the acceleration part 410.

Hereinafter, a showerhead 500 according to a fifth embodiment will be described.

For convenience of description, parts similar to those of the first embodiment will be denoted by the same reference numerals, and duplicated description with respect to the first embodiment will be omitted.

Figure 9:
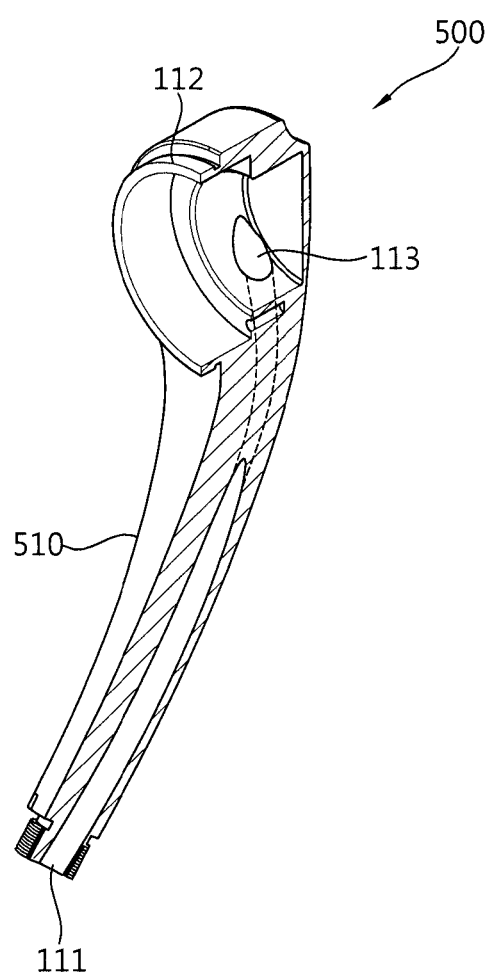
FIG. 9 is a cross-sectional view of a showerhead body according to a fifth embodiment of the present invention.

FIG. 9 is a cross-sectional view of a showerhead body according to a fifth embodiment of the present invention.

When compared to the showerhead 100 according to the first embodiment, the showerhead 500 according to the fifth embodiment includes a body 510 for swirling shower water introduced into the showerhead 500.

To generate eddy in a discharge part 112, as shown in FIG. 9, a path through which an inflow part 111 communicates with the discharge part 112 may be dislocated with a central axis of a length direction of a body 110. Thus, an outlet 113 of the path may be spaced apart from the central axis.

When shower water is introduced through a passage having the above-described structure, the shower water may rotate along an inner surface of the discharge part 112 to generate the eddy. However, even though the path or the outlet of the path coincides with the central axis of the length direction of the body 110, a guide for guiding the shower water in a left or right direction may be disposed on the outlet of the path to generate the eddy.

When the shower water is swirled in the discharge part 112, a shear force may act on the shower water to primarily generate micro air bubbles. Then, gases contained in the shower water may be finely divided to effectively generate micro air bubbles in the bubble-generating part 130.

Hereinafter, a showerhead 600 according to a sixth embodiment will be described.

For convenience of description, parts similar to those of the first embodiment will be denoted by the same reference numerals, and duplicated description with respect to the first embodiment will be omitted.

Figure 10A:
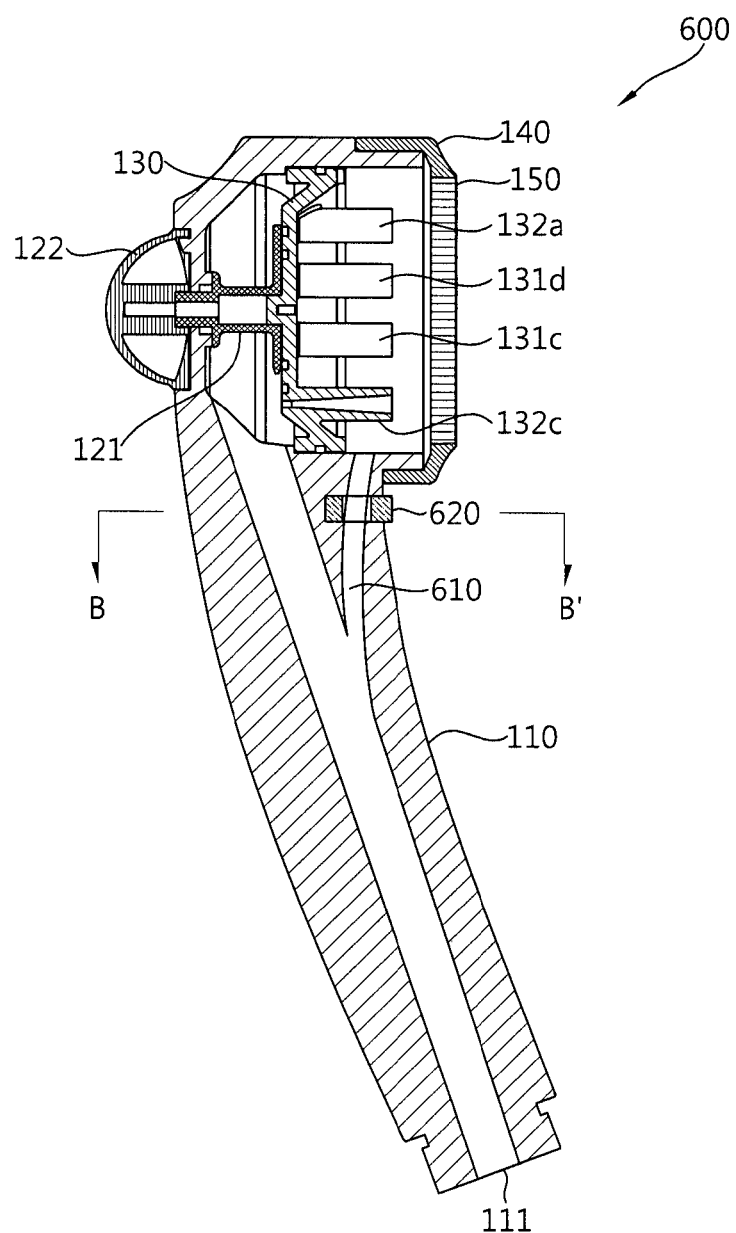
FIG. 10A is a cross-sectional view of a showerhead body according to a sixth embodiment of the present invention.

FIG. 10A is a cross-sectional view of a showerhead body according to a sixth embodiment of the present invention.

When compared to the showerhead 100 according to the first embodiment, the showerhead 600 according to the sixth embodiment of the present invention may include an auxiliary passage 610, which is branched from a passage connecting an inflow part 111 to a discharge part 112 so that an outlet is disposed between a bubble-generating part 130 and a shower part 150, within a body 110.

Since shower water passing through the auxiliary passage 610 is discharged without passing through the bubble-generating part 130 having a narrow passage, the showerhead 600 according to the current embodiment may discharge a more amount of shower water.

Also, a switch 620 for opening or closing the auxiliary passage 610 may be disposed on a side of the body 110.

Figure 10B:
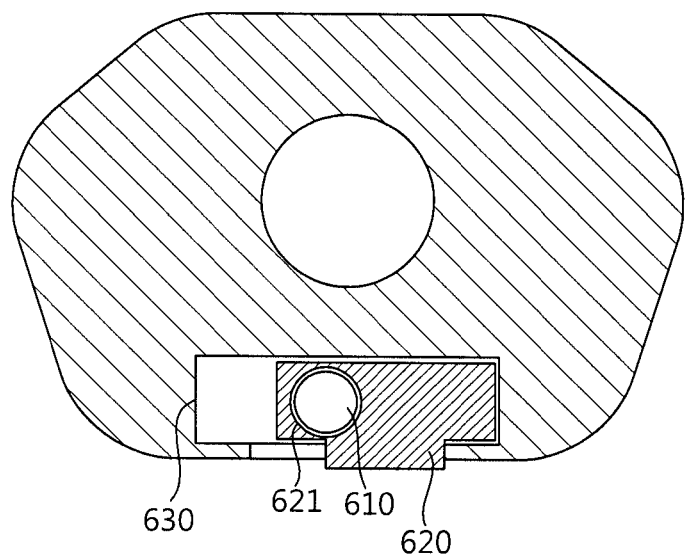
FIG. 10B is a cross-sectional view taken along line B-B' of FIG. 10A.

FIG. 10B is a cross-sectional view taken along line B-B' of FIG. 10A. Referring to FIG. 10B, the switch 610 is disposed on the side of the body 110 to pass through the auxiliary passage 610. Also, a water flow hole 621 communicating with the auxiliary passage 610 is defined in the switch 620. A front surface of the switch 620 is exposed to the outside. Thus, a user may move the front surface of the switch 620 exposed to the outside of the body 110 in a left a right direction to open or close the auxiliary passage 610.

A space 630 in which the switch 620 moves in the left or right direction is defined in the body 110. In FIG. 10B, when the switch 620 moves in the right direction, the water flow hole 621 and the auxiliary passage 610 may overlap with each other. Thus, the shower water may move through the auxiliary passage 610. On the other hand, when the switch 620 moves in the left direction, the switch 620 blocks the auxiliary passage 610. The switch 620 may have various shapes to block the auxiliary passage.

For user's convenience, the switch 420 may be replaced with a valve that is capable of adjusting a flow rate (an amount of shower water).

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, future modifications to the embodiments of the present invention cannot depart from the technical scope of the present invention.

The invention claimed is:

1. A showerhead comprising:
   a body having an end in which an inflow part for introducing shower water is disposed and the other end in which a discharge part for discharging the shower water introduced through the inflow part is disposed;
   a bubble-generating part provided in the body and coupled to the discharge part, the bubble-generating part comprising a plurality of bubble-generating tubes which have an inlet diameter less than an outlet diameter;
   a fluid regulator part provided on the back surface of the bubble-generating part and configured to open or close a portion of the whole of the plurality of bubble-generating tubes so as to adjust the number of the open bubble-generating tubes; and
   a shower part disposed in a front side of the bubble-generating part, the shower part having a plurality of shower holes through which the shower water is discharged to the outside;
   wherein the fluid regulator part comprises a shield part for opening or closing a portion of the plurality of bubble-generating tubes and a manipulation part interlocked and coupled to the shield part to enable manual manipulation of the shield part at the outside of the body.

2. The showerhead of claim 1, wherein the shield part comprises a sliding plate having one surface that is closely attached to a back surface of the bubble-generating part to open or close inlets of the bubble-generating tubes in a slide manner.

3. The showerhead of claim 2, further comprising an interlocking part disposed between the shield part and the manipulation part to convert rotation movement of the manipulation part into sliding movement of the sliding plate.

4. The showerhead of claim 3, wherein a first tooth is disposed on a back surface of the sliding plate,
   a cylindrical screw part on which a first male thread is disposed on a side surface thereof is disposed on an end of the manipulation part,
   the interlocking part comprises a fan-shaped plate, wherein a second tooth corresponding to the first tooth is disposed on one portion of a curved surface of the interlocking part, and a third tooth corresponding to the first male thread is disposed on the other portion of the curved surface of the interlocking part, and the interlocking part is coupled so that the second tooth is engaged with the first tooth, and the third tooth is engaged with the first male thread.

5. The showerhead of claim 1, wherein the shield part is spaced apart from a side of an inlet of each of the bubble-generating tubes, and a distance between the shield and the inlet of each of the bubble-generating tubes is adjusted by the rotation of the manipulation part.

6. The showerhead of claim 5, wherein the shield part comprises a fluid regulator pin, which is insertable into each of the bubble-generating tubes, on one surface thereof.

7. The showerhead of claim 5, wherein a cylindrical bolt part on which a male thread is disposed on a side surface thereof is disposed on a back surface of the shield part, and a nut part having a cylindrical groove so that the bolt part is inserted therein and a female thread corresponding to the male thread along the inside of the groove is disposed on an end of the manipulation part.

8. The showerhead of claim 5, wherein a cylindrical bolt part on which a male thread is disposed on a side surface thereof is disposed on an end of the manipulation part, and a nut part having a cylindrical groove so that the bolt part is inserted therein and a female thread corresponding to the male thread along the inside of the groove is disposed on a back surface of the shield part.

9. The showerhead of claim 1, further comprising an acceleration part disposed between the discharge part and the bubble-generating part, the acceleration part having an ejecting hole with a diameter less than an inner diameter of the discharge part.

10. The showerhead of claim 1, further comprising a collision wall disposed between the bubble-generating part and the shower part to collide with the shower water discharged through the bubble-generating tubes and a bypass part having a passage to bypass the shower water colliding with the collision wall toward the shower holes.

11. The showerhead of claim 1, wherein the body further comprises an auxiliary passage that is branched from a passage connecting the inflow part to the discharge part so that an outlet thereof is disposed at a side of the discharge part.

12. The showerhead of claim 11, wherein the auxiliary part has an outlet between the bubble-generating part and the shower part.

13. The showerhead of claim 11, further comprising a fluid regulator, which passes through the auxiliary passage to open or close the auxiliary passage at the outside of the body, on a side of the body.

\* \* \* \* \*